United States Patent [19]

Pao et al.

[11] Patent Number: 5,848,402
[45] Date of Patent: Dec. 8, 1998

[54] UNIVERSAL SYSTEM FOR ARTIFICIAL INTELLIGENCE BASED LEARNING, CATEGORIZATION, AND OPTIMIZATION

[75] Inventors: Yoh-Han Pao, Cleveland Heights; Pui-Chiu Yip, Euclid, both of Ohio

[73] Assignee: AI Ware, Inc., Beachwood, Ohio

[21] Appl. No.: 689,338

[22] Filed: Aug. 6, 1996

Related U.S. Application Data

[63] Continuation-in-part of Ser. No. 271,484, Jul. 7, 1994, abandoned.

[51] Int. Cl.⁶ .................................................. G06F 15/18
[52] U.S. Cl. ............................................. 706/13; 706/14
[58] Field of Search ................... 706/13, 25, 51, 706/10, 14

[56] References Cited

U.S. PATENT DOCUMENTS

| | | | |
|---|---|---|---|
| 4,843,540 | 6/1989 | Stolfo | 395/800.11 |
| 4,858,147 | 8/1989 | Conwell | 706/19 |
| 4,933,871 | 6/1990 | DiSieno | 706/25 |
| 5,088,048 | 2/1992 | Dixon et al. | 706/51 |
| 5,163,133 | 11/1992 | Morgan et al. | 395/800.21 |
| 5,175,854 | 12/1992 | Cheung et al. | 395/670 |
| 5,214,746 | 5/1993 | Fogel et al. | 706/25 |
| 5,361,385 | 11/1994 | Bakalash | 345/424 |
| 5,442,758 | 8/1995 | Slingwine et al. | 707/8 |

FOREIGN PATENT DOCUMENTS

| | | | |
|---|---|---|---|
| PCT/US93/02616 | 3/1993 | WIPO | G06F 15/18 |

OTHER PUBLICATIONS

Percy P.C. Yip, et al., Combinatorial Optimization with Use of Guided Evolutionary Simulated Annealing, *IEEE Transactions on Neural Networks,* vol. 6 No. 2, pp. 290–295, Mar. 1993.

Percy P.C. Yip, et al., A Guided Evolutionary Simulated Annealing Approach to the Quadratic Assignment Problem, *IEEE Transactions on Systems, Man, and Cybernetics,* vol. 24 No. 9, pp. 1383–1387, Sep. 1994.

Samir W. Mahfoud, et al., Parallel recombinative simulated annealing: A genetic algorithm, *Parallel Computing,* pp. 1–28, Jan. 21, 1995.

Piet Spiessens, A Massively Parallel Genetic Algorithm Implementation and First Analysis, *Proceedings Of The Fourth International Conference on Genetic Algorithms,* San Diego, California, pp. 279–285, Jul. 13–16, 1991.

Yip, Percy P.C., et al. "A Parallel and Distributed Processing Algorithm for Facility Layout," *Neural Networks in Design and Manufacturing,* 1993 pp. 77–97.

(List continued on next page.)

*Primary Examiner*—Tariq R. Hafiz
*Assistant Examiner*—Sanjiv Shah
*Attorney, Agent, or Firm*—Benesch, Friedlander, Coplan & Aronoff LLP

[57] ABSTRACT

A parallel, distributed processing system is provided for solving NP-hard problems, and the like, efficiently, quickly and accurately. The system employs parallel processors which are iteratively and intelligently allocated for a series of generations of child solutions from selected, previous generation or parent solutions. The system employs multiple levels of competition for generating a next level of possible solutions and for reallocating processor resources to the most promising regions for finding a best solution to the task. This includes both inter-family competition, as well as intra-family competition. System temperature data are set and gradually decreased with each succeeding generation. A degree of randomness is entered into the solution generation. The hierarchical and iterative process, incorporating randomness and a decreasing temperature provides for the guided evolutionary simulated annealing solution generation.

20 Claims, 5 Drawing Sheets

OTHER PUBLICATIONS

Yip, Percy P.C. et al., "A New Approach to the Traveling Salesman Problem," *International Joing Conference on Neural Networks,* 1993, pp. 1569–1572.

Yip, Percy P.C. et al., "A New Optimizer for the Facility Layout Problem," *International Joint Conference on Neural Networks,* 1993, pp. 1573–1576.

Yip, Percy P.C. et al., "A Fast Universal Training Algorithm for Neural Networks," *Proceedings of World Congress on Neural Network,* vol. III, 1993, pp. 614–621.

Yip, Percy P.C. et al., "Growing Neural Networks Using Guided Evolutionary Simulated Annealing," *The Third Annual Conference on Evolutionary Programming,* Feb. 1994, pp. 1–9.

Yip, Percy P.C., et al., "A Guided Evolutionary Computation Technique as Function Optimizer," *The IEEE Conference on Evolutionary Computation,* Jun. 1994, pp. 1–6.

Yip, Percy P.C. et al., "A Guided Evolutionary Simulated Annealing Approach to the Quadratic Assignment Problem," *The IEEE Transactions on Systems, Man, and Cybernetics,* vol. 24, No. 9, Sep. 1994, pp. 1–24.

Holland, John H., "Genetic Algorithms," *Scientific American,* Jul. 1992, pp. 66–72.

Rioio, Rick L., "The Amateur Scientist," *Scientific American,* Jul. 1992, pp. 114–116.

Goldberg, David E., *Genetic Algorithms in Search, Optimization, and Machine Learning,* Jan. 1989, Chapter 1, pp. 10–14.

Goldberg, David E., "Computer Implementation," *Genetic Algorithms in Search, Optimization, and Machine Learning,* Jan. 1989, Chapter 3, pp. 59–125.

Murdock, T.M. et al., "Use of a Genetic Algorithm to Analyze Robust Stability Problems," *Proceedings of the American Control Conference,* 1991 vol. 1, pp. 886–889.

Voigt, Hans–Michael et al., "A Structured Distributed Genetic Algorithm for Function Optimisation," pp. 199–208.

Tsuchiya, Kazuhiro, "Th Survey for the Genetic Algorithm," Jan. 1993.

Prados, D.L., "New Learning Algorithm for Training Multilayered Neural Networks That Uses Genetic–Algorithm Techniques," Jun. 1992.

Fogel, D.B. et al., "Comparing Genetic Operators with Gaussian Mutations in Simulated Evolutionary Processes Using Linear Systems," *Biological Cybernetics,* 1990, pp. 111–114.

Muhlenbein, H. et al., "The Parallel Genetic Algorithm as Function Optimizer," *Parallel Computing,* 1991, pp. 619–632.

Bornholdt, Stefan et al., "General Asymmetric Neural Networks and Structure Design by Genetic Algorithms," *Neural Networks,* 1992, vol. 5, pp. 327–334.

Fogel, D.B., "An Evolutionary Approach to the Traveling Salesman Problem," *Biological Cybernetics,* 1988, pp. 139–144.

5,848,402

UNIVERSAL SYSTEM FOR ARTIFICIAL INTELLIGENCE BASED LEARNING, CATEGORIZATION, AND OPTIMIZATION

Related Applications

The present application is a continuation-in-part of application Ser. No. 08/271,484 filed Jul. 7, 1994, now abandoned.

TECHNICAL FIELD

This application pertains to the art of multi-processor computer systems, and more particularly to a multi-processor computer system adapted for efficient solution of extremely complex problems. It will be appreciated that the system has broader applications, such as in the providing of fast or real-time solutions to problems that are not solvable with conventional computer technology without an inordinate allocation of processor time.

BACKGROUND OF THE INVENTION

There exists a large number of problems for which no easily discernable solution may be obtained. However, it is accepted that these problems do, in fact, have a solution. Two types of such optimization problems are combinatorial optimization problems and continuous or functional optimization problems.

Common examples of combinational optimization (also referred to hereinafter as "NP-hard" or "NP-complete"), problems include the "traveling salesman problem," the "four-color map problem," and the like. In the traveling salesman problem, a salesman must visit a number of cities. A scheduling of trips is desirable which minimizes the total mileage which must be traveled to reach every city. Of course, such a solution exists. However, it may only be found through conventional computation with brute-force calculations.

In the four-color map problem a two-dimensional map of political subdivisions is provided. It is desired that a color scheme be affixed such that a different color is assigned for each such subdivision wherein no two adjoining subdivisions are provided with the same color. It has been proven that such a solution exists. Again, the selection is not apparent and requires massive computations to secure a solution.

Another such NP-hard problem is the facility layout problem. The task in the facility layout problem is to assign n facilities to n locations. A non-negative weight is associated with the activity between each pair of facilities. It is desired to place each facility in a location that serves to minimize the sum of the weights times distances between pairs of facilities. It is difficult or prohibitive to provide enough conventional computer power to secure a solution by conventional search techniques.

In functional optimization problems, the task is to find the location and value of a global minimum (or maximum) for a continuous function defined in a multi-dimensional space. For example, the cost of an item may be a non-linear function of both item size and item weight. The defined function might be represented as a three dimensional plot having a plurality of local maxima and minima. The slope of the "hills" and "valleys" around the local maxima and minima values can vary considerably, thereby creating a complicated three dimensional landscape. Typically, a gradient search technique is applied to find a solution to such a functional optimization problem.

Often times, there is a desire to provide a solution to such problems in real-time. Early approaches to solving such problems without conventional computing techniques have employed artificial intelligence-based systems. A recurring problem with conventional artificial intelligence approaches is found with "local minimum." Many solution curves provide a solution at which the first derivative is zero and the second derivative negative. This might appear, at first glance, to provide an overall system minimum and desirable solution. Further investigation often reveals that the function was, in fact, provided at a local minimum. Thus, a better system-wide solution was available but is not readily discernable.

Different artificial intelligence based systems may more readily lend themselves to finding solutions for one or the other of the two types of optimization problems discussed above. It is desirable to provide a system to efficiently utilize processing resources to solve both types of optimization problems.

SUMMARY OF THE INVENTION

The present invention contemplates a new and improved computing system which overcomes the above-referred problems, and others, and provides an artificial intelligence based system for efficient use of processor resources to quickly and accurately provide best solutions for combinatorial optimization problems and functional optimization problems.

In accordance with the present invention, there is provided a parallel, distributed processing system for problem solutions employing what is referred to as guided evolutionary simulated annealing ("GESA"). The system includes a plurality of processor units, each of which includes its own local memory. "Parent" or early generation solutions are provided to each of N of the plurality of processors. Each processor is provided with initial "temperature" data. The individual processors generate "child" or later generation solutions from the parents assigned thereto. A competition is undertaken between the child solutions to determine the best child. The best child competes with the parent of its family to determine the parent of the next generation. The victors of this competition form the parents for a next iteration. It is possible for the best child to become the parent of the next generation even if it is not better than its parent.

A competition is undertaken among the families to determine the number of children to be allocated to each family in the next iteration. All of the children of a family are evaluated relative to the current best global solution to determine the fitness of the family. The number of children allocated to each family for the next iteration is based on the family's fitness. After each iteration of generating a next generation of parents, the temperature coefficients are decreased. Further, at this time a test of possible solutions is made against preselected acceptability standards. Also, a preset number of maximum iterations is provided. The results of these later two tests selectively allow for problem termination.

In accordance with yet another aspect of the present invention, a method is provided for implementing the guided evolutionary simulated annealing noted above.

In accordance with a further aspect of the present invention, a specified hardware platform adapted to accomplish the afore-mentioned guided evolutionary simulated annealing extremely quickly or in real-time is provided.

An advantage of the subject invention is the provision of a system which facilitates efficient use of processor resources for rapid and accurate isolation of a best solution of NP-hard problems.

Yet another advantage in the present invention is the provision of a solution for NP-hard problems which uses relatively inexpensive hardware.

Yet another advantage of the present invention is the provision of a solution for NP-hard problems which may be readily and easily adapted to a large variety of such problems.

Further advantages will be apparent to one of ordinary skill in the art upon reading and understanding of the subject specification.

BRIEF DESCRIPTION OF THE DRAWINGS

The invention may take physical form in certain parts, and arrangements of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
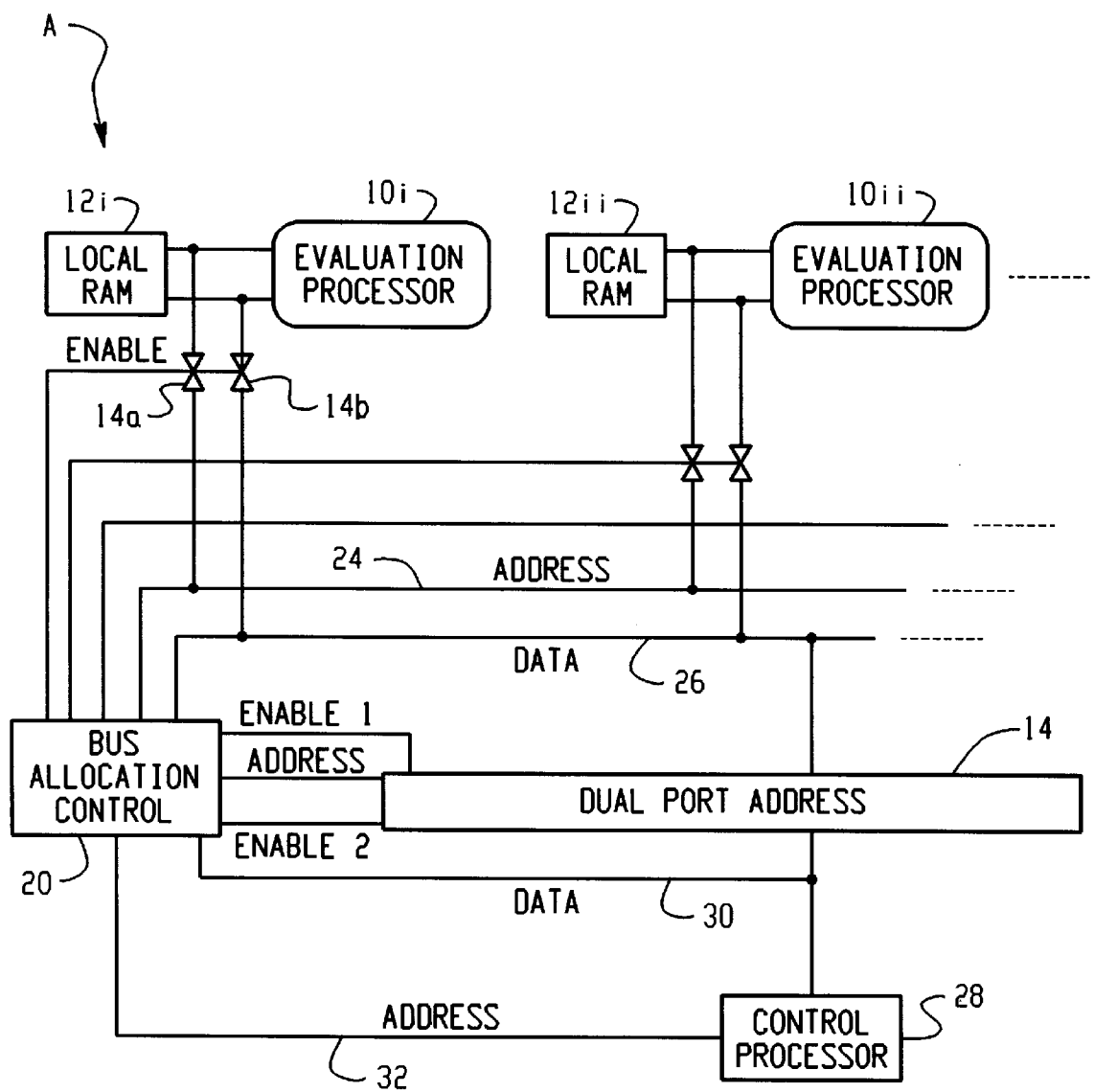
FIG. 1 illustrates, in block diagram form, a hardware, multi-processor platform to realize the guided evolutionary simulated annealing solution.

Referring now to the drawings wherein the showings are for the purpose of illustrating the preferred embodiment of the invention only, and not for the purpose of limiting the same, FIG. 1 illustrates a multi-processor platform A suited for accomplishing parallel, distributed processing for achieving problem solutions employing guided evolutionary simulated annealing. The multiprocessor platform A includes a plurality of evaluation processors 10$i$, 10$ii$, ... 10$n$. Each evaluation processor is provided with its own local memory or RAM 12$i$, 12$ii$, ... 12$n$, respectively.

Each evaluation processor/local RAM pair 10, 12 provides a mechanism by which the processor may run with a local program and using localized data. Each evaluation processor is also in contact with a dual port memory 14 for data transfer with the control processor. The RAM/evaluation complex is selectively isolated from an associated address bus and data bus by tri-state buffers 14$a$ and 14$b$. One of the dual data port of the dual port memory 14 is enabled and the other port 13 is disabled by a bus allocation control 20. The bus allocation control 20 keeps track of the system state that defines the control of the dual port memory.

The control processor 28 may suitably run under instructions and data provided in dual port memory 14. Alternatively, the control processor 28 may also be provided with its own local RAM such as local RAM 12 associated with each evaluation processor 10.

The architecture of FIG. 1 allows for highly efficient concurrently processing of intra-family solution possibilities, as well as inter-family solution possibilities in connection with the subject guided evolutionary simulated annealing system disclosed herein. This allows for an efficient and quick determination of an acceptable solution, which may be even accomplished in real-time. The particular processes as run in connection with the multi-processor platform of A of FIG. 1 will be detailed below.

In the architecture of FIG. 1, both the control processor 28, as well as the evaluation processors 10 can have control of the dual-port memory 14. When the control processor 28 is in control of the memory and the data bus, the evaluation processors are precluded from accessing the memory until control released. Similarly, when the evaluation control processors 12 are in control of the dual port memory 14, the control processor cannot access the memory until released. The control state of the memory is determined by the current system state, as will be described below.

The bus allocation control 20 serves to keep track of a current state of the system. In the preferred embodiment, a register (not shown) disposed within the bus allocation control 20 keeps track of a current system state. The control processor 28 updates the system state when the evaluation processors 10 or the control processor 28 signals completion of a current task. Both the control processor 28 and the evaluation processors 10 can access the register within the bus allocation control 20 to update a current machine state. Thus, all processors are informed when they are able to proceed to a next task in the series thereof which will be detailed below.

As noted above, each evaluation processor 10 is provided with its corresponding local RAM 12 in the preferred embodiment. The local memory of each evaluation processor is not shared by other evaluation processors. However, local memory may be accessed by the control processor 28 so it can load some of the parameters, data, or functions, or the like. Basically, each evaluation processor 10 performs a task specific to a function in its respective local memory.

The control processor 28 functions to allocate and distribute sub-tasks to each evaluation processor 10, via its corresponding local RAM 12. The control processor 28 may suitably pass parameters to each evaluation processor via dual port memory 14. Alternatively, the information may be passed directly to the individual evaluation processors local memory.

During implementation of the GESA system, detailed below, the control processor 28 receives the statement of the task, determines parent solutions and assigns parent solutions for each evaluation processor 10 for each iteration, determines a best result obtained up to a current iteration, determines whether a new iteration is required, and determines the number of children to be allocated to each family in each iteration.

The evaluation processors 10 each determine the objective value for the parent solutions assigned to it, generate children solutions from the parents, determine the objective values for the children, determine whether a child is accepted and, determines an acceptance number of each family represented therein.

The dual port memory 14 serves as a communication interface for the control processor 28 and the evaluation processors 10. Both the control processor 28 and the evaluation processor 10 can access the dual port memory 14. However, control is determined by a current system state as noted above.

Figure 2:
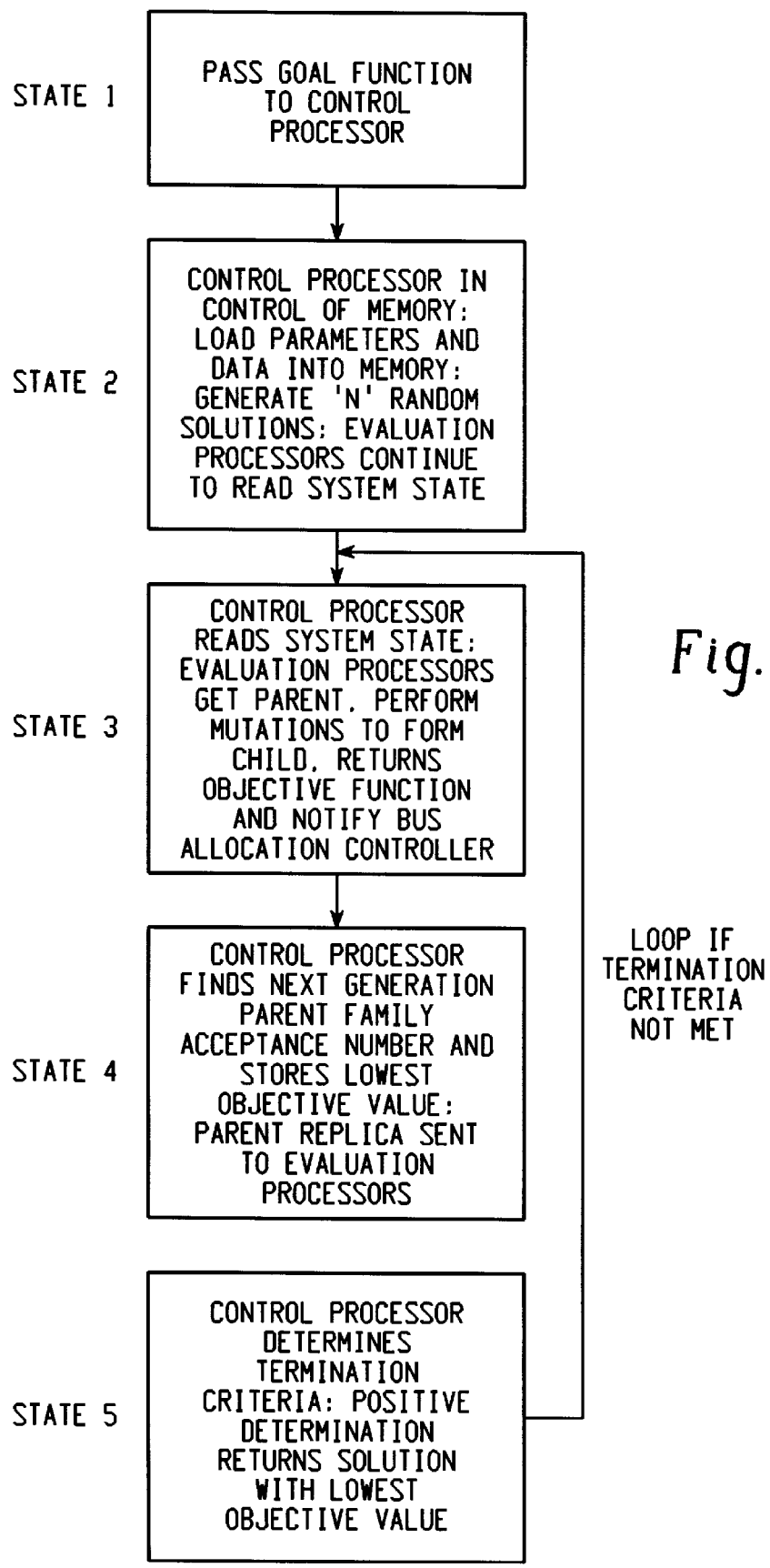
FIG. 2 illustrates a state diagram of the hardware architecture of FIG. 1 in connection with the subject invention.

The operation of the subject hardware platform may suitably be thought in terms of five different operation states. operation of each module within the multi-processor platform A is determined by a current state of the system. The following state description is provided in FIG. 2.

State 1

State 1 provides an entry point from the GESA algorithm. The system goes to this state when the GESA algorithm is called by another part of the complete program. A goal function is passed to the control processor, at which point the system passed to state 2.

State 2

When in state 2, the control processor 28 is in full control of the dual port memory 14. It loads an evaluation function, parameters and data into memory so that the evaluation processors 10 can use them in later states. Additionally, the control processor 28 generates N solution candidates randomly. These solution candidates are called parent solutions or parents. The control processor 28 replicates M copies for each Parent, and stores the copies into the local memory 12 for each evaluation processor.

When in state 2, the evaluation processors 10 continue reading the system state, as provided in bus allocation control 20, until proceeding to state 3 as detailed below. The control processor 28 releases the bus by giving a signal to the bus allocation control 20. At this point, the system state is incremented by one, i.e., to state 3.

State 3

While in state 3, the control processor 28 continues reading the system state until the system progresses to state 4. Each evaluation processor receives a parent, provides a mutation to generate a child solution or child therefrom. It evaluates and returns an objective value and an acceptance status of that child. Each evaluation processor signals the bus allocation controller 20 when it has finished its evaluation. The bus allocation controller 20, in turn, increments the system state by one after all evaluation processors 10 have signalled to indicate completion of their respective evaluations. This causes progress to state 4.

State 4

While in state 4, the control processor 28 determines a parent of a next generation solution and an acceptance number from each family. It then computes a number of child processes or children that should be generated in the subsequent generation, for each parent. Replica of the parents according to that number are generated and stored in a respective local memory 12 for each evaluation processor. The control processor 28 also determines a lowest objective value. It stores that lowest objective value in the local memory 12 associated with each evaluation processor 10. Thus, each evaluation processor may determine its own acceptance.

This evaluation continues by reading the system state until it progresses to state 5. The control processor 28 signals the bus allocation controller after it has finished a task for a current state. At this point, the state is incremented by one to state 5.

State 5

While in state 5, the control processor 28 checks termination criteria. A positive determination, based on this check, results in the return of a solution with a lowest objective value, to a user program. Otherwise, the control processor changes the system back to state 3 and progress therefrom.

Implementation of Guided Evolutionary Simulated Annealing

Figure 3:
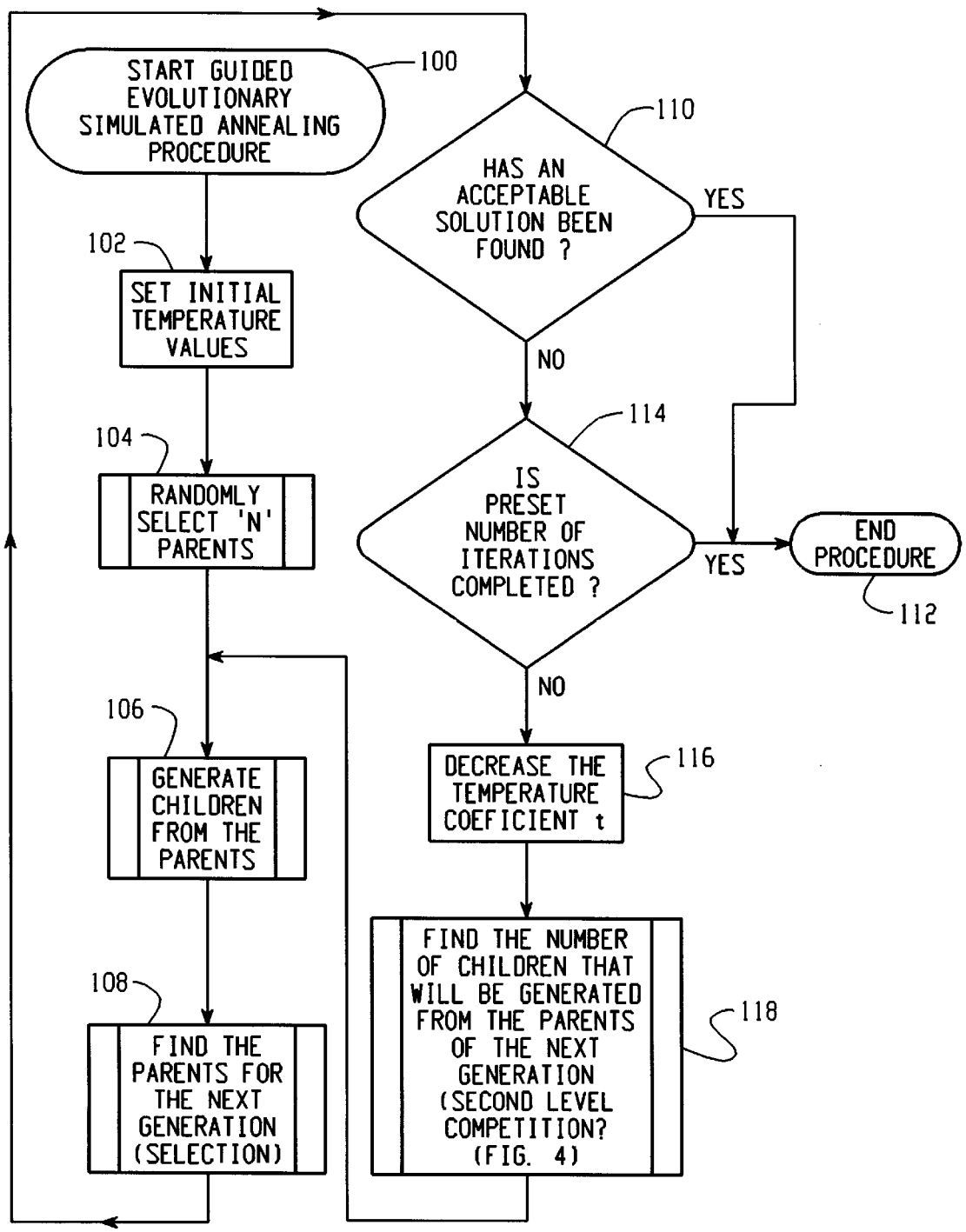
FIG. 3 illustrates, in flow chart form, the activities of the overall system in connection with guided evolutionary simulated annealing solutions.
Figure 4:
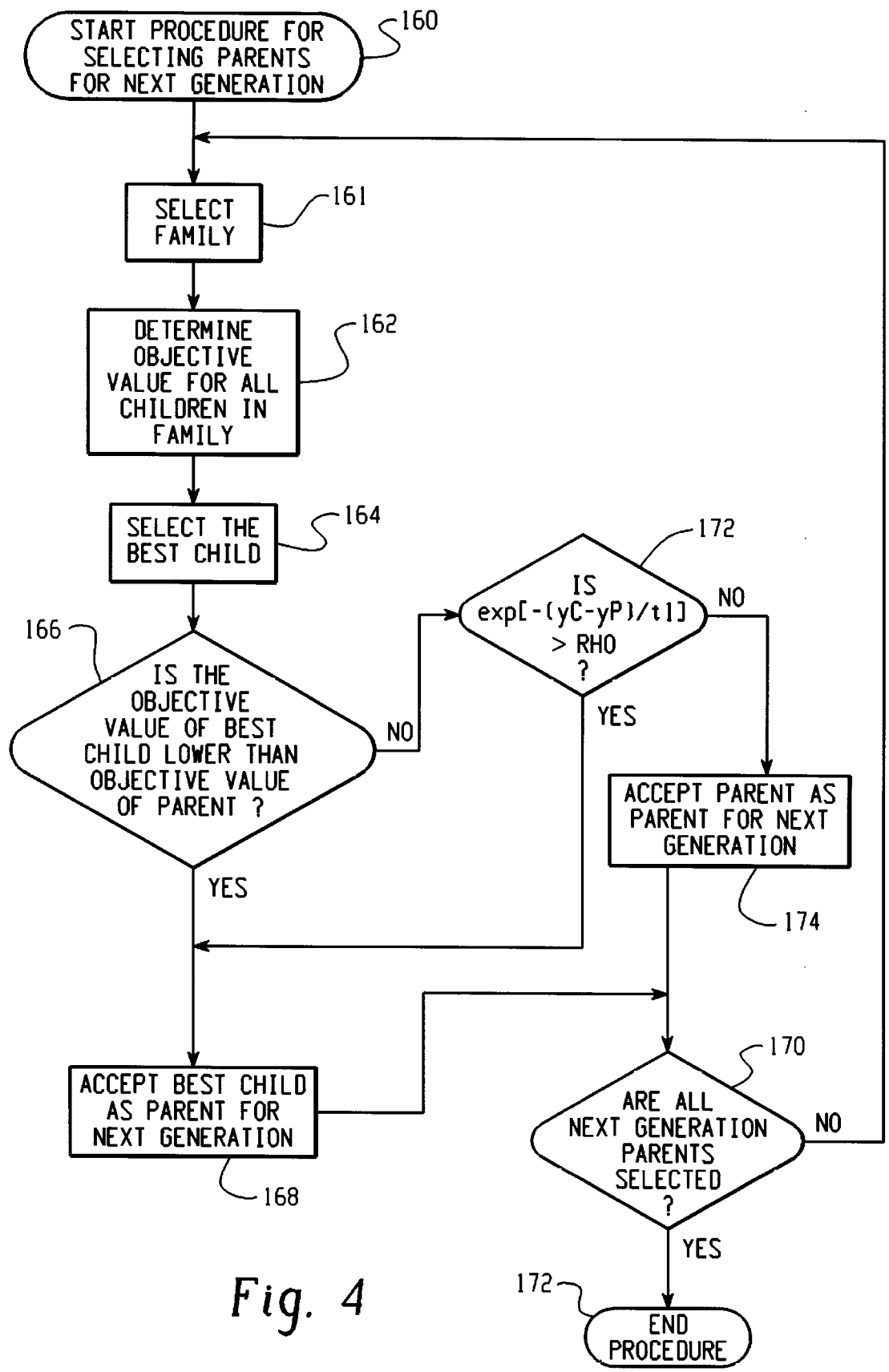
FIG. 4 illustrates, in flow chart form, activities for intra-family solution competition.
Figure 5:
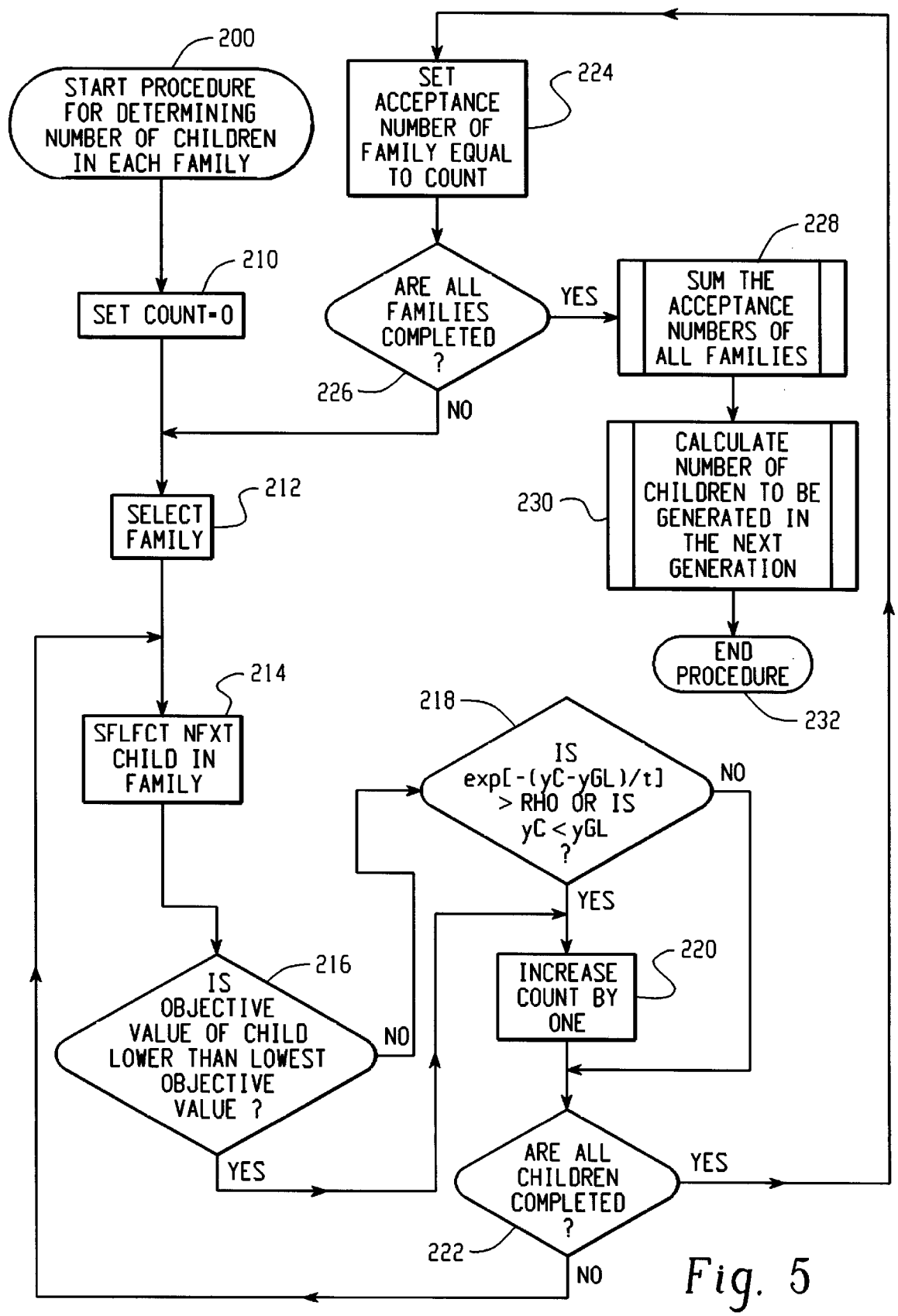
FIG. 5 illustrates, in flow chart form, activities for inter-family solution competition.

Referring now to FIGS. 3–5, the control process of the present invention will be better appreciated. The GESA search technique starts out with a guess of N likely solution candidates. In the preferred embodiment, these candidates are chosen at random from the solution search space. These candidates are the parent solution or so-called parents. Initially, each parent generates the same number of children, for example, $M_{11}$.

As noted above, the GESA system provides two levels of competition. In a local competition the children in the family (i.e., generated from the same parent), compete with one another and only the child with the lowest objective value survives. This best child then competes with its own parent to determine which should survive to become the parent for the next iteration. If the best child is better than its parent, then it is accepted as a parent for the next generation. If the best child is worse than his parent, there is a Boltzmann probability that the child will be accepted. In the preferred embodiment, the best child is accepted as a parent for a subsequent generation if:

$$Y_c < Y_p$$

or if, $$\exp\left[\frac{-(y_C - y_P)}{t_1}\right] > p$$

wherein, $Y_c$=an objective value of a best child solution, $Y_p$=an objective value of a parent solutions, associated with the best child solution, p=a random number randomly distributed between 0 and 1, and $t_1$=a temperature coefficient.

This forms the local competition to create parents for a next generation.

The second level of competition is competition among families. A number of children to be generated for each family in a next generation depends on a result of such second level competition. A measure of fitness is calculated for each family to be used in the second level competition.

A typical measure might be against an objective value of a single point. However, such a measure may be biased. Instead, in the present invention, all children are used for such a measure. Each child has an objective value that is compared to a lowest objective value ever found for all solution candidates in an entire evolution process. That is to say, an objective value of a child is compared to a lowest objective value found in the entire population, up to the previous generation. If the child is better than the lowest objective value, then it is accepted and the family count is incremented. Family count is also referred to as family acceptance number which is a measure of family fitness compared relative to the other families. If the objective value of the child is worse than the lowest object value, there is a Boltzmann probability that the child will be accepted and the family count incremented. In the preferred embodiment, the child is accepted and the family count incremented if:

$$Y_c < Y_{GL}$$

as described above, or if, $$\exp\left[\frac{-(y_C - y_{CL})}{t_2}\right] > p$$

wherein, $Y_c$=an objective value of a child solution, $Y_{GL}$=a lowest objective value of solutions found in the entire population, up to the previous generation, p=a random number randomly distributed between 0 and 1, and $t_2$=a temperature coefficient.

The total number of children T generated in each generation is due to fixed hardware considerations. In a massively parallel machine, a number of processing elements is fixed. Insofar as each individual in the population is handled by a processing element, such as the evaluation processors 10 of FIG. 1, the dimension on the population should be fixed.

$$T = \sum_{i=1}^{N} m_i$$

A number of children from the next generation for each family is chosen to be proportional to the acceptance number for the family such that:

$$M^1 = \frac{T \times A}{S}$$

wherein, $M^1$=the number of children that will be generated for that family,

T=the total number of available children for all families, e.g. M×N children,

A=the acceptance number for that family, and

S=the sum of the acceptance numbers, i.e. counts, for all families.

thus, there remains a constant total number of children T to be reallocated among the families according to family fitness as indicated by the family acceptance number.

The afore-noted procedure continues until a preselected number of iterations have been reached, or until such time as an acceptable solution has been found. The second level competition has an effect of giving a measure of regional information. The acceptance number provides information as to how good a region is. If a region is believed to have a better likelihood of obtaining an optimal solution (as measured by a higher acceptance number), the search focuses more intently on this region.

In a preferred embodiment, each of (i) the local competition, (ii) the global competition, and (iii) the children generation functions have a temperature value. The system starts with a higher initial temperature value for each. These temperature values are decreased after each generation until each reaches a "freezing temperature," at which time the temperature stops decreasing. A preferred method of varying each of the temperature values is expressed as:

$$t_{new} = c \times t_{old}$$

wherein, c is a constant less than 1.

The foregoing system may also be viewed as parallel simulated annealing with competition. Each family may be thought of as a multiple-trial-parallel simulated annealing machine, with the children contributing trials in parallel. In the GESA implementation we have N parallel simulated annealing machines. These N machines compete with one another. The better solution will have more trials and the worst will have fewer trials. The number of trials should be increased with a decreasing temperature level. The inter-family competition (second level or global competition), provides such a mechanism. A number of trials for a best parallel simulated annealing machine (that is the number of children generated from the best family), increases with decreasing temperature or increasing iterations.

Turning particularly to FIG. 3, the general control process of the present invention will be better appreciated. The flow chart details the overall GESA process. The system is commenced at block 100. At block 102, the control processor 28 receives (i) the statement of the task, (ii) the names of variables, (iii) the ranges for the variables, (iv) the objective function, and the values for search parameters, e.g. initial temperature value are set for all three temperature values $t_1$, $t_2$, and $t_3$. The number N of families is specified as well as the total number of children T=M×N where M is the number of children allocated to each family N for the first iteration. The system then progresses to block 104.

In block 104, the N initial parent solutions are selected randomly by the control processor. The control processor posts the description of each of the parents and assigns the initial N parents to N evaluation processors. The control processor then initially assigns M children to each N parents, thereby forming families. The children are given ID's to indicate parent or family affiliation. A particular child will remain at the same processor throughout all of the subsequent iterations regardless of new family allocations. Further, some processors may be reserved for processing children only thereby having a total number of processors in excess of N. The allocation of children described above among the processors results in efficient utilization of processor resources regardless of the increased size of a particular family due to reallocation of children based on family fitness. Also in block 104, the evaluation processors evaluate the objective function for each parent allocated to the evaluation processor. The objective value for each parent solution is returned to the control processor. The control processor then orders the objective values for all of the parent solutions and posts, i.e. saves, the lowest parent objective value as the initial global minimum objective value $Y_{GL}$.

Next, in block 106, the evaluation processors generate children or child solutions from their parents or parent solutions. A simple mutation of a randomly selected element in a parent solution is used to generate a child. Preferably, the random change is proportional to $t_3$.

In block 108, the first level (intra-family or local competition) is undertaken to determine which parents will be used for a next generation. The competition is amongst the children to determine the best child in a family. Then, the best child competes against its parent to become the next generation parent.

Referring to FIG. 4, the process for selecting the next generation parents will be better appreciated. The process begins at block 160. Next, in block 161, a family is selected which has yet to have the next generation parent determined. In block 162, the evaluation processors determine the objective value for each of the children in the selected family. Next, in block 164, the evaluation processors find the best child, i.e. the lowest objective value, from each family represented in an evaluation processor. The best children from the families are returned, with their family ID's, to the control processor to compete with their respective parents. In block 166, the competition between the best child and its parent begins where a determination is made as to whether the objective value of the best child in a family is better than the objective value of its parent. If the determination in block 166 is affirmative, the process proceeds to block 168 where the best child is accepted as the parent for the next generation. If the determination in block 166 is negative, indicating that best child is worse than its parent, the process proceeds to block 172. In block 172, there is a determination as to whether the best child satisfies the Boltzmann probability criterion as described above. If the determination in block 172 is affirmative, the process proceeds to block 168 where the child is selected as the next generation parent.

From block 168 the process then proceeds to step 170 where a determination is made as to whether all of the parents for the next generation have been selected. If all the families have been evaluated and all next generation parents are selected, the process proceeds to step 172 where the first level competition procedure is ended. If the determination in step 170 is negative indicating that additional families have yet to determine the next generation parent, the process returns to block 161. In block 161, a next family, yet to be addressed, is selected and the process continues as described above to evaluate the newly selected best child and parent.

If the Boltzmann probability criterion determination in block 172 is negative, indicating that the parent is the victor of the competition, the process continues on to block 174 where the parent is accepted as the parent for the next generation. From block 174 the process advances to block 170 and the remainder of the process continues as described above.

For each family, the control processor specifies and posts the ID for the parents of the next generation. The control processor compares all of the objective values and determines the new global minimum objective value $Y_{GL}$. The new global objective value is then posted by the control processor for use by the evaluation processors. Once all of the families have completed the first level competition, and all of the next generation parents have been selected and posted, the process then returns to the overall control process shown in FIG. 3.

Referring again to FIG. 3, the process continues to block 110 where a test is made against preselected criteria to determine whether an acceptable solution has been found. A positive determination results in an end or completion of the procedure at block 112. A negative determination causes an inquiry at block 114. This inquiry determines whether a preset number of iterations have been completed. Again, a positive determination results in an end of the procedure at block 112. A negative determination causes the process to advance to block 116. At block 116, the temperature coefficients $t_1$, $t_2$, and $t_3$ are decreased as described above.

Next, a detailing of the procedure associated with the second level or inter-family competition, as provided at block 118 of FIG. 3, will be described with FIG. 5.

The inter-family global competition commences at block 200. In block 210, the evaluation processors set a value COUNT equal to zero for the families represented therein. At step 210, a next family, which has yet to be addressed, is selected. The selected family is then dealt with commencing at block 214. At this point, a child which has yet to be dealt with, is selected. At block 216, the objective value of that child is tested to determine whether it is lower than the lowest global minimum objective value $Y_{GL}$. A negative determination causes progress to block 218, at which point the above-noted equation is tested. A positive determination at block 216 causes progress to block 220. At this point, the value COUNT for the family is incremented.

Returning back to block 218, a positive determination results in progress to block 220, as described above. The output of block 220, as well as a negative determination resultant from block 218, causes progress to block 222. At this point, a determination is made at to whether all children within the particular family have been addressed. If not, the next child is selected back in block 214. If so, progress is made to block 224.

In block 224, an acceptance number of the particular family is set equal to the value COUNT. The evaluation processors determine the acceptance numbers for all of the families represented therein and returns the acceptance numbers to the control processor. In step 226, each evaluation processor determines whether all of the families represented therein have been evaluated. If the determination is negative, the process returns to block 212. If the determination in block 226 is affirmative, indicating that evaluation of all of the families is completed, the process continues to block 228. At this point, all families have been dealt with and have been provided with an acceptance number. Block 228 sums the acceptance number of all such families. Next, at block 230, a calculation, as described above, is made as to the number of children to be generated in the next generation. The routine ends at 232, at which point progress would be made back to block 112 of FIG. 3.

The GESA system detailed above has been applied to several NP-complete problems. In each instance, the GESA approach has been found to provide a quick and accurate means of solving such problems. It will be appreciated by one skilled in the art that the GESA system (i) is an efficient guided optimization technique that reallocates processor resources to focus the solution task in the most promising solution areas, (ii) efficiently distributes the processing tasks among the processors, (iii) has the capability to escape from local minima, and (iv) has the ability to converge to a solution with arbitrary accuracy. The GESA algorithm is free of the constraints of linear representation imposed by using binary strings and does not require pairing in generating new child solutions.

This invention has been described with reference to the preferred embodiment. obviously, modifications and alterations will occur to others upon a reading and understanding of the specification. It is intended that all such modifications and alternations be included insofar as they come within the scope of the appended claims or the equivalents thereof.

Having thus described the invention, it is now claimed:

1. A parallel, distributed processing system for problem solutions employing guided evolutionary simulated annealing comprising:

an iteration data storage for storing data representative of a preselected number of iterations;

means for storing an integer N representative of a number of randomly generated parent solutions;

means for allocating an integer M representative of a number of children solutions to each of the N parent solutions;

means for allocating M×N children solutions among each of an integer P representative of a plurality of processor units;

means for enabling the plurality P of processor units, each processor unit including, means for receiving data representative of one of the N parent solutions, generating means for generating child solutions from the received one of the N parent solutions, the parent solution and all child solutions generated from the parent solution forming a family, global comparison means for comparing each child solution generated by the generating means against a preselected global criterium, and pruning means for selecting a subset N' of child solutions generated by the generating means in accordance an output of a local comparison means for comparing each child solution generated by the generating means against a preselected local criterium, the subset of N' child solutions forms a next generation of parent solutions;

means for re-allocating the M×N number of children solutions among each of the N' parent solutions in response to the global comparison means; and means for iteratively communicating N' child solutions as a next generation of N parent process to the plurality P of processor units until reaching at least one of (i) the preselected number of iterations in accordance with a comparison of the data representative of a preselected number of iterations stored in the iteration data storage and (ii) achievement of an acceptable solution from the previous child solution subset.

2. The parallel, distributed processing system for problem solutions employing guided evolutionary simulated annealing of claim 1 further comprising:
a temperature data storage for storing temperature data representative of an initial temperature t;
means for decreasing a value of the temperature data during each iteration of the preselected number of iterations; and wherein the pruning means includes means for selecting the subset of child solutions in accordance with the temperature data.

3. The parallel, distributed processing system for problem solutions employing guided evolutionary simulated annealing of claim 2 further comprising:
means for computing an objective value $y_p$ of a parent solution in the family;
means for computing an objective value $Y_c$ of each child solution in the family;
means for storing a value representative of a lowest objective value associated with child solutions in the family;
testing means for testing the lowest objective value associated with the child solutions against the objective value of the parent of the family; and
wherein the pruning means further includes means for selecting the subset of child solutions in accordance with an output of the testing means.

4. The parallel, distributed processing system for problem solutions employing guided evolutionary simulated annealing of claim 3 wherein the testing means tests the child solutions against the local criterion in accordance with at least one of the relation, $$Y_c < y_p$$

or, $$\exp\left[\frac{-(y_C - y_P)}{t_1}\right] > p$$

wherein,
$Y_c$=an objective value of a best child solution,
$Y_p$=an objective value of a parent solutions, associated with the best child solution,
p=a random number randomly distributed between 0 and 1, and
$t_1$=a temperature coefficient.

5. The parallel, distributed processing system for problem solutions employing guided evolutionary simulated annealing of claim 3 wherein the global comparison means includes means for incrementing a count value in response to the preselected global criteria.

6. The parallel, distributed processing system for problem solutions employing guided evolutionary simulated annealing of claim 5 wherein the preselected global criteria are in accordance with at least one of the relation, $$Y_c < y_{GL}$$

or, $$\exp\left[\frac{-(y_C - y_{CL})}{t_2}\right] > p$$

wherein,
$Y_c$=an objective value of a child solution,
$Y_{GL}$=a lowest objective value of solutions found in the entire population, up to the previous generation,
p=a random number randomly distributed between 0 and 1, and
$t_2$=a temperature coefficient.

$$M' = \frac{T \times A}{S}$$

7. The parallel, distributed processing system for problem solutions employing guided evolutionary simulated annealing of claim 6 wherein the means for reallocating the M×N number of children among each of the N' parents is in accordance with,
wherein,
M'=the number of children to be allocated to that family,
T=the total number of children available for all families, i.e. N×M,
A=the count value in response to the global criteria for the family, and
S=the sum of all count values for all families during an iteration.

8. The parallel, distributed processing system for problem solutions employing guided evolutionary simulated annealing of claim 7 further comprising means for incrementing a count value for each of the plurality of processor units each time the plurality of N processors are enabled.

9. A method of parallel and distributed processing for problem solutions employing guided evolutionary simulated annealing comprising the steps of:
storing data representative of a preselected number of iterations;
storing an integer N representative of a number of randomly generated parent solutions;
simultaneously enabling N of a plurality of processor units;
receiving, in each processor unit, data representative of one of the N parent solutions;
allocating M child solutions to each one of the N parent solutions forming families;
allocating the M×N children solutions among the plurality of processor units;
generating, in each processor unit, child solutions from the one of the N parent solutions;
comparing, in each processor unit, each child solution generated in the generating step against a preselected global criterium;
determining the fitness of each family in response to the comparison of children of a family against the preselected global criterium;
pruning so as to select a subset of N' child solutions generated by the step of generating in accordance an output of a step of locally comparing the children of a family against preselected local criterium, the subset of child solutions forms a next generation of parent solutions;

reallocating the M×N number of children solutions among each of the N' parent solutions in response to the fitness determination; and iteratively communicating N' child solutions as a next generation of N parent process to the plurality of processor units until reaching at least one of (i) the preselected number of iterations in accordance with a comparison of the data representative of a preselected number of iterations stored in the iteration data storage and (ii) achievement of an acceptable solution from the previous child solution subset.

10. The method of parallel and distributed processing for problem solutions employing guided evolutionary simulated annealing of claim 9 further comprising the steps of:

computing an objective value $y_p$ of a parent solution in the family;

computing an objective value $Y_c$ of each child solution in the family;

storing a value representative of a lowest objective value associated with child solutions in the family;

testing the objective value of the lowest objective value associated with child solutions against the objective value of the parent of the family; and wherein the step of pruning further includes selecting the subset of child solutions in accordance with an output of the step of testing.

11. The method of parallel and distributed processing for problem solutions employing guided evolutionary simulated annealing of claim 10 further comprising the steps of:

storing temperature data representative of an initial temperature t;

decreasing a value of the temperature data during each iteration of the preselected number of iterations; and selecting the subset of child solutions in accordance with the temperature data.

12. The method of parallel and distributed processing for problem solutions employing guided evolutionary simulated annealing of claim 11 wherein the step of determining the fitness of the families includes incrementing a count value in response to the comparison against the preselected global criteria.

13. The method of parallel and distributed processing for problem solutions employing guided evolutionary simulated annealing of claim 12 further comprising the step of incrementing a count value for each of the plurality of processor units each time the plurality of N processors are enabled.

14. The method of parallel and distributed processing for problem solutions employing guided evolutionary simulated annealing of claim 10 wherein the step of testing further includes the step of completing a local comparison in accordance with at least one of the relation, $$Y_c < Y_p$$

or, $$\exp\left[\frac{-(y_C - y_P)}{t_1}\right] > p$$

wherein, $Y_c$ = an objective value of a best child solution, $Y_p$ = an objective value of a parent solutions associated with the best child solution, p = a random number randomly distributed between 0 and 1, and $t_1$ = a temperature coefficient.

15. A parallel processor system for parallel, distributed processing system for problem solutions employing guided evolutionary simulated annealing comprising:

a plurality of evaluation processors;

a local memory associated with each evaluation processor, each local memory including,
means for storing data representative of one of N parent solutions,
means for storing a count value representatives of number of iterations of calculations therethrough, and
means for storing data representative of a lowest acceptable objective value;

a common memory selectively in data communication with each of the evaluation processors, the common memory including,
means for storing data representative of a preselected number of iterations,
means for storing an integer N representative of a number of randomly generated parent solutions,
temperature data storage for storing temperature data representative of an initial temperature t, and
means for storing data representative of an acceptable solution of a given problem;

each evaluation processor including,
means for receiving data representative of one of the N parent solutions,
means for allocating an integer M representative of a number of children solutions to each of the N parent solutions;
means for allocating the M×N children solutions among the plurality of evaluation processors;
generating means for generating child solutions from the one of the N parent solutions,
global comparison means for comparing each child solution against a pres global criterium;
local comparison means for comparing each child solution generated by the generating means against the objective value of its parent, and
pruning means for selecting a subset of N' child solutions generated by the generating means in accordance an output of the local comparison means, the subset of N' child solutions forms a next generation of parent solutions; and means for re-allocating the M×N number of children solutions among each of the N' parent solutions in response to the global comparison means.

16. The parallel, distributed processing system for problem solutions employing guided evolutionary simulated annealing of claim 15 wherein the preselected global criteria are in accordance with at least one of the relation, $$Y_c < Y_{GL}$$

or, $$\exp\left[\frac{-(y_C - y_{CL})}{t_2}\right] > p$$

wherein, $Y_c$ = an objective value of a child solution, $Y_{GL}$=a lowest objective value of solutions found in the entire population, up to the previous generation, p=a random number randomly distributed between 0 and 1, and $t_2$=a temperature coefficient.

17. The parallel processor system for parallel, distributed processing system for problem solutions employing guided evolutionary simulated annealing of claim 15 further comprising bus allocation control means to coordinate transfers between each local memory and the common memory.

18. The parallel processor system for parallel, distributed processing system for problem solutions employing guided evolutionary simulated annealing of claim 17 further comprising a control processor in data communication with the bus allocation control means and the system memory for allocating each next generation of parent solutions to a subset of the evaluation processors.

19. The parallel processor system for parallel, distributed processing system for problem solutions employing guided evolutionary simulated annealing of claim 18 wherein the common memory is comprised of dual port memory facilitating concurrent access of a plurality of processors to data disposed therein.

20. The parallel processor system for parallel, distributed processing system for problem solutions employing guided evolutionary simulated annealing of claim 19 wherein the control processor includes its own local memory for storing local data and instructions therefor.

* * * * *